United States Patent [19]

Kimura et al.

[11] 4,130,073

[45] Dec. 19, 1978

[54] AUTOMATIC SEWING MACHINE

[75] Inventors: Koya Kimura, Numazu; Shinji Machi, Mishima; Shigetugu Matunaga, Numazu, all of Japan

[73] Assignee: Toshiba Kikai Kabushiki Kaisha, Tokyo, Japan

[21] Appl. No.: 826,072

[22] Filed: Aug. 19, 1977

Related U.S. Application Data

[63] Continuation-in-part of Ser. No. 771,265, Feb. 23, 1977, abandoned.

[30] Foreign Application Priority Data

Feb. 25, 1976 [JP] Japan .................... 51-19619

[51] Int. Cl.² .................... D05B 21/00; B23C 1/16
[52] U.S. Cl. .................... 112/121.12; 90/13 R
[58] Field of Search .................... 112/121.12, 121.11; 90/11 C, 13 R, 13 C, 13.5; 83/564, 902

[56] References Cited

U.S. PATENT DOCUMENTS

| 3,503,293 | 3/1970 | Sander .................... 83/564 X |
| 3,752,098 | 8/1973 | Logan et al. .................... 112/121.12 |
| 3,799,084 | 3/1974 | Furnari .................... 112/121.11 |
| 3,800,639 | 4/1974 | Restel .................... 83/902 X |
| 3,810,414 | 5/1974 | Gerber .................... 112/121.12 X |

Primary Examiner—Peter Nerbun
Attorney, Agent, or Firm—Koda and Androlia

[57] ABSTRACT

In an automatic sewing machine of the type comprising a memory device storing a predetermined sewing pattern, a movable head including a cloth clamping member for clamping a piece of cloth to be sewed to a movable head, a pulse motor controlled by an electric signal read out from the memory device for moving the movable head at a predetermined speed thereby sewing the piece of cloth according to the sewing pattern, a working tool is mounted on the sewing machine, and a blank of a cloth clamping member is mounted on the movable head at a position to be worked by the working tool. At this time the pulse motor is driven at a speed lower than the predetermined speed, thereby working the blank to have a profile corresponding to the sewing pattern.

5 Claims, 13 Drawing Figures

| ADDRESS | TYPE OF CONTROL | | | | SEWING MACHINE CONTROL | | FEED IN ±X DIRECTION | | | | FEED IN ±Y DIRECTION | | | | REPETITION NUMBER DATA | | | | | REMARK |
|---|---|---|---|---|---|---|---|---|---|---|---|---|---|---|---|---|---|---|---|---|
| 32 | − | O | O | − | O | O | O | O | O | O | O | O | O | O | O | O | O | O | O | STOP SIGNAL |
| 33 | O | − | O | − | O | O | − | O | O | O | O | O | O | O | O | O | O | O | O | START PERFORATION PG—QC |
| 34 | O | O | − | − | O | O | O | − | O | O | O | O | O | O | O | O | O | O | O | ⎡ OPTIONAL QC→R1 |
| 35 | O | O | O | − | O | O | O | O | − | O | O | O | O | O | O | O | O | O | O | ⎣ |
| 36 | − | O | O | O | O | O | O | O | O | − | O | O | O | O | O | O | O | O | − | OPTIONAL R1→R2 |
| 37 | O | − | O | O | O | O | O | O | O | O | − | O | O | O | O | O | O | O | O | OPTIONAL R2→R3 |
| 38 | O | O | − | O | O | O | O | O | O | O | O | − | O | O | O | O | O | O | − | |
| 39 | O | O | O | O | O | O | − | O | O | O | O | O | − | O | O | O | O | O | O | OPTIONAL R3→R4 |
| 40 | − | − | O | O | O | O | O | − | O | O | O | O | O | − | O | O | O | O | − | OPTIONAL R4→R |
| 41 | O | O | O | O | O | O | O | O | − | O | O | O | O | O | − | O | O | O | O | GRADING SIGNAL "1" |
| 42 | − | O | − | O | O | O | O | O | O | − | O | O | O | O | O | − | O | − | O | |
| 43 | O | − | − | O | O | O | − | O | O | O | − | O | O | O | O | O | − | O | O | |
| 44 | − | − | − | O | O | O | O | − | O | O | O | − | O | O | O | O | O | − | − | |
| 45 | O | O | O | − | O | O | O | O | − | O | O | O | − | O | O | O | O | O | O | |
| 46 | − | O | O | − | O | O | O | O | O | − | O | O | O | − | O | O | O | O | − | |
| 47 | O | − | O | − | O | O | O | O | O | O | − | O | O | O | − | O | O | O | O | |
| 48 | O | O | − | − | O | O | O | O | O | O | O | − | O | O | O | − | O | O | − | |
| 49 | O | O | O | − | O | O | O | O | O | O | O | O | − | O | O | O | − | O | O | |
| 50 | − | O | O | O | O | O | O | O | O | O | O | O | O | − | O | O | O | − | − | |
| 51 ~ 100 | | | | | | | | | | | | | | | | | | | | PATARN C (POINTS d4-1~d4-5 SHOW MIDDLE POINT OF RESPECTIVE SIZES) |
| 101 ~ 180 | | | | | | | | | | | | | | | | | | | | PATARN A |
| | | | | | | | | | | | | | | | | | | | | PATARN B |

AUTOMATIC SEWING MACHINE

CROSS-REFERENCE TO RELATED APPLICATIONS

This application is a continuation-in-part application of our copending application Ser. No. 771,265, filed Feb. 23, 1977, now abandoned.

BACKGROUND OF THE INVENTION

This invention relates to an automatic sewing machine, more particularly to an automatic sewing machine which cannot only perform normal programmed pattern sewing operations but also work a blank of a cloth clamping member utilized to clamp a piece of cloth being sewed to a movable head by using the same control device utilized to move the head during the normal sewing operation such that not only the pattern configuration of the clamp but also openings provided for the clamp for receiving various pins, for example pin openings utilized to set the position of the cloth when it is mounted on the clamp, and a pin hole utilized to position the needle at the starting point of the sewing operation (origin of the sewing operation) are worked.

Generally, in an automatic sewing machine utilized to automatically sew a number of parts of clothes by mass production technique, a piece of cloth is clamped to a movable head by means of a pair of cloth clamping members and the movable head is moved in the X and Y directions of a rectangular coordinate in accordance with a signal read out from a memory device storing a sewing program and contained in the sewing machine. When sewing a profile including an arbitrary curve such as the collar, cuffs and pocket covers of a shirt, for example, by an automatic sewing machine, a piece of cloth to be sewed is clamped between cloth clamping members which are secured to the movable head.

Figure 1:
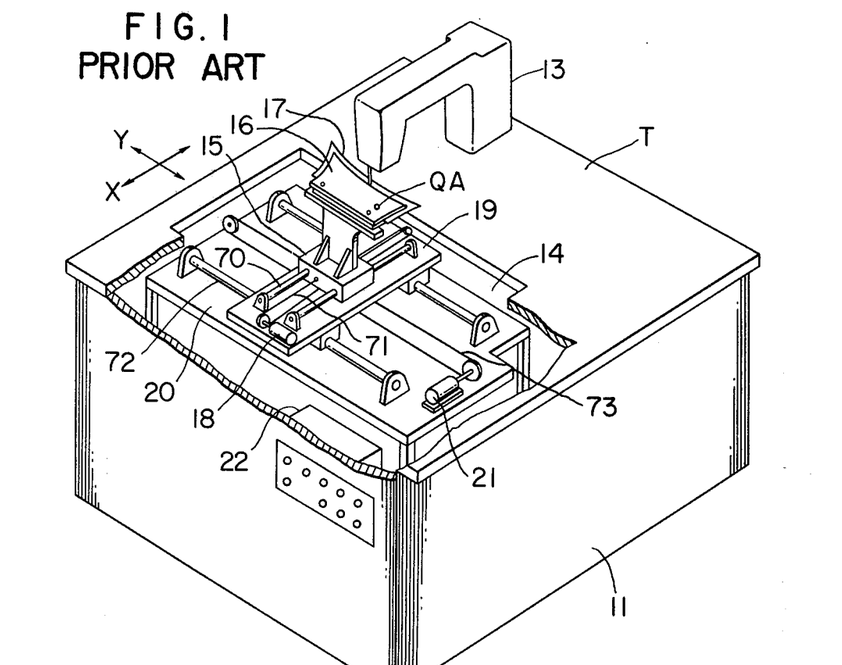
FIG. 1 is a perspective view showing a typical prior art automatic sewing machine to which the invention is applicable.

FIG. 1 is a perspective view showing one example of such automatic sewing machine comprising a head of the sewing machine 13 mounted on a table T, which in turn is supported by a side frame 11.

Figures 1A, 8:
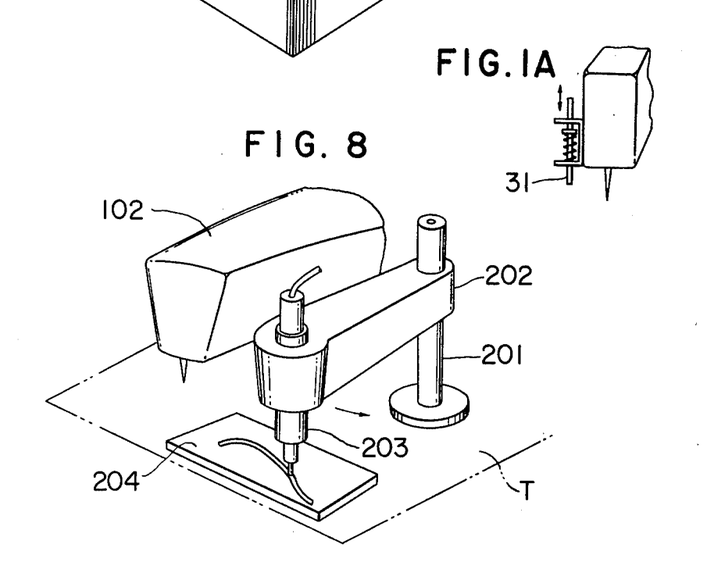
FIG. 1A is a perspective view showing a pin for determining the starting position of the needle.
FIG. 8 is a diagrammatic perspective view showing a modified embodiment of this invention.

As shown in FIG. 1A, to the lefthand side wall of the head 13 is slidably mounted a pin 31 which when inserted in an opening QA at the working origin of a cloth clamping member 16 brings a sewing needle immediately above the starting position of the sewing operation. The table T is provided with a rectangular opening 14 through which a movable head 15 including cloth clamping members 16 projects. The movable head 15 is mounted on a carriage 19 to be moved in the direction along guide rods 70 by means of a pulse motor 18 and a piano wire 71. The carriage 19 is moved in the Y direction along guide rods 72 by means of a pulse motor 21 and a piano wire 73. A control device 22 is contained in the side frame 11.

Figure 2:
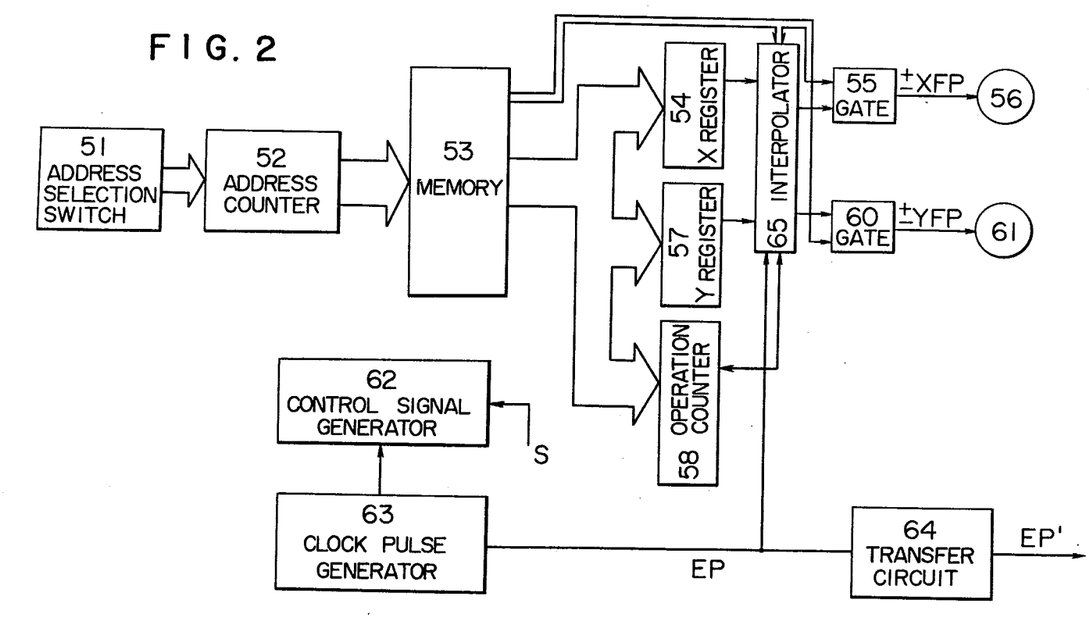
FIG. 2 is a block diagram showing the control circuit utilized in this invention.

FIG. 2 is a block diagram of a control circuit contained in the control device 22 and utilized to move the movable head 15 in a X-Y plane. The control circuit comprises an address selection switch 51 for setting an address of a memory device 53 corresponding to the starting point of a sewing program and an address counter 52 for designating an address in the memory device 53, the count of the counter 52 increasing with the number of addresses set by the address selection switch 51. In the addresses of the memory device 53 are stored a number of sewing programs corresponding to various sewing patterns or profiles. For example, three programs of the patterns of collars A and B and cuff C, working programs of the openings at respective working origins QC, QA, QC (see FIG. 3) and the program of the pin holes for setting the position of the cloth clamped between the cloth clamping members 16, are stored in addresses 0-50, 51-100 and 101-180 respectively. In this case, the address selection switch 51 sets addresses 0, 51 and 101. X register 54 and Y register 57 are used to set the number of pulses in the X and Y directions stored in the memory device corresponding to respective sewing pitches. The outputs of the X and Y registers are applied to an interpolator 65 which may be linear type because the sewing pitch is about 2 mm in most cases. Gate circuits 55 and 60 are connected to receive pulses sent from the interpolator 65 and representing X and Y directions and signals sent from the memory device 53 and representing forward or rearward direction for applying output pulses ±XFP and ±YFP to pulse motors 56 and 61 respectively which correspond to pulse motors 18 and 21 shown in FIG. 1. An operation counter 58 is provided to count the number of sewing operations where the direction of sewing of a profile is the same, for example. The sewing operations are made at a definite interval in the X direction. This arrangement decreases the number of addresses of the memory device 53 required to sew a given profile. A control signal generator 62 produces a timing signal supplied to various elements 52, 53, 54, 57 and 58 and gate signals supplied to various gate circuits in response to the clock pulse of a predetermined frequency and generated by a clock pulse generator 63.

Figure 3A:
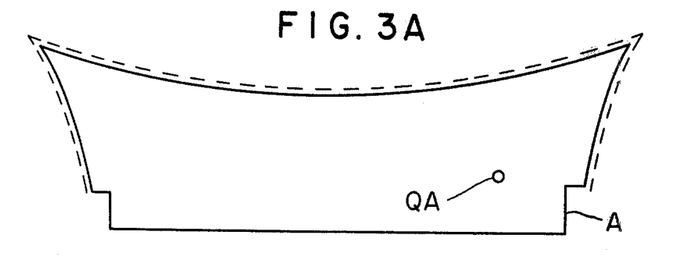
FIGS. 3A, 3B and 3C are plan views showing three examples of the cloth clamping member.
Figure 3B:
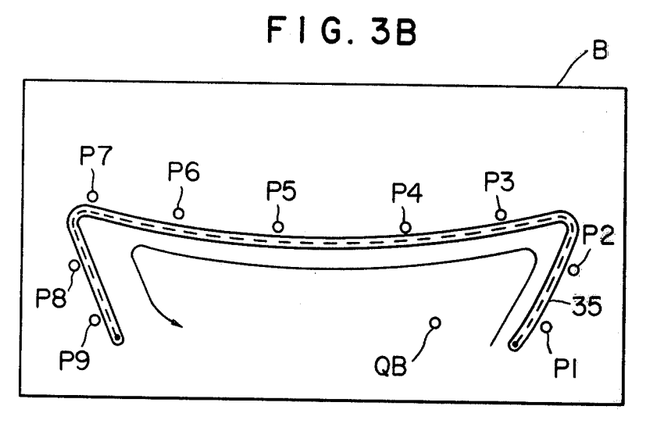

The automatic sewing machine shown in FIG. 1 utilizes two clamping members 16 for clamping a piece of cloth 17 to be sewed between them (actually two superposed pieces). FIGS. 3A and 3B show two types A and B of a collar and FIG. 3C a cuff C of a shirt. In the case of A, the outer periphery (shown by heavy lines) of the clamping member represents the sewing pattern and QA an opening at the working origin, whereas in the case of B, a slot shaped sewing pattern 35, an opening at the working origin QB, and pin openings $P_1$ through $P_9$ for setting the position of the cloth are formed in the clamping member as shown in FIG. 3B. In the same manner, in the case of sewing a cuff C, the cloth clamping member is provided with a groove 36 corresponding to the profile of the cuff, an opening at the working origin QC and pin openings $R_1$ through $R_8$. In each case, dotted lines show the passage of the needle. Before this invention, the sewing patterns of the clamping members A, B and C have been prepared by manual works independently of the sewing machine. Especially, in the cases of B and C, working accuracy of the grooves 35 and 36 is low and the working thereof requires much labour and time. Although the positional relationship between the origins QB and QC and the entire pattern curves including the starting positions of the sewing operation must be accurate, the working of the openings at the working origins and the working of the sewing patterns has not been correctly correlated.

Although it has been proposed to use the same computer control for the normal sewing operation of the sewing machine and the working of the blanks of the cloth clamping members as disclosed in U.S. Pat. No. 3,810,414, this method is not advantageous in that owing to considerably high sewing speeds of the sewing machines, especially those used in mass production scale, it is difficult to work grooves or peripheries of complicated patterns at such high speeds.

According to another prior art method, accurately finished templates were prepared and the clamping members were prepared by profiling the template. This method requires to use an independent profile modeling machine. In order to perform satisfactory sewing operation it is necessary to bring the pattern close as far as possible to sewing profiles shown by dotted lines in FIGS. 3A, 3B and 3C.

In mass production of clothes, it is necessary to prepare and store many types of the clamping members having different patterns for sewing clothes of different size and fashion.

SUMMARY OF THE INVENTION

It is an object of this invention to provide an improved sewing machine capable of not only performing normal programmed pattern sewing operation but also working a blank of a cloth clamping member by using the same memory device storing a predetermining sewing program.

Another object of this invention is to provide an automatic sewing machine capable of readily working a cloth clamping member having a desired profile by merely mounting a simple working tool on the sewing machine.

A further object of this invention is to provide an improved automatic sewing machine capable of working a blank of a cloth clamping member at a speed lower than the normal sewing speed.

A still further object of this invention is to provide an automatic sewing machine which can work a blank of the cloth clamping member so as to form a predetermined sewing pattern as well as openings for determining the origin of the sewing operation and for correctly positioning the cloth on the clamping member.

According to this invention these and further objects can be accomplished by providing an automatic sewing machine of the type comprising a memory device storing a predetermined sewing pattern, a movable head including a cloth clamping member for clamping a piece of cloth to be sewed to the movable head, electric drive means energized by an electric signal read out from the memory device for moving the movable head at a predetermined speed thereby sewing the piece of cloth according to the sewing pattern, a working tool mounted on the sewing machine, and means for mounting a blank of the cloth clamping member on the movable head at a position to be worked by the working tool, characterized in that there is provided means for driving the electric drive means at a speed lower than the predetermined speed thereby working the work to have a profile corresponding to the pattern.

DESCRIPTION OF THE PREFERRED EMBODIMENTS

Figure 4:
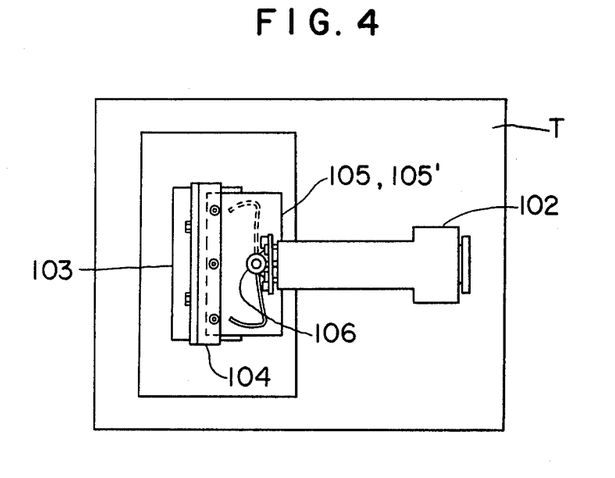
FIG. 4 is a plan view showing one embodiment of this invention.

Turning now to the accompanying drawings, one embodiment of this invention is illustrated in FIG. 4. As shown, a working tool 106 is secured to the lefthand side of the head 102 of the automatic sewing machine shown in FIG. 1. A pair of blanks 105 and 105' of the cloth clamping members to be worked by the working tool are secured to the movable head 15 by a mounting fixture 104.

Figure 5:
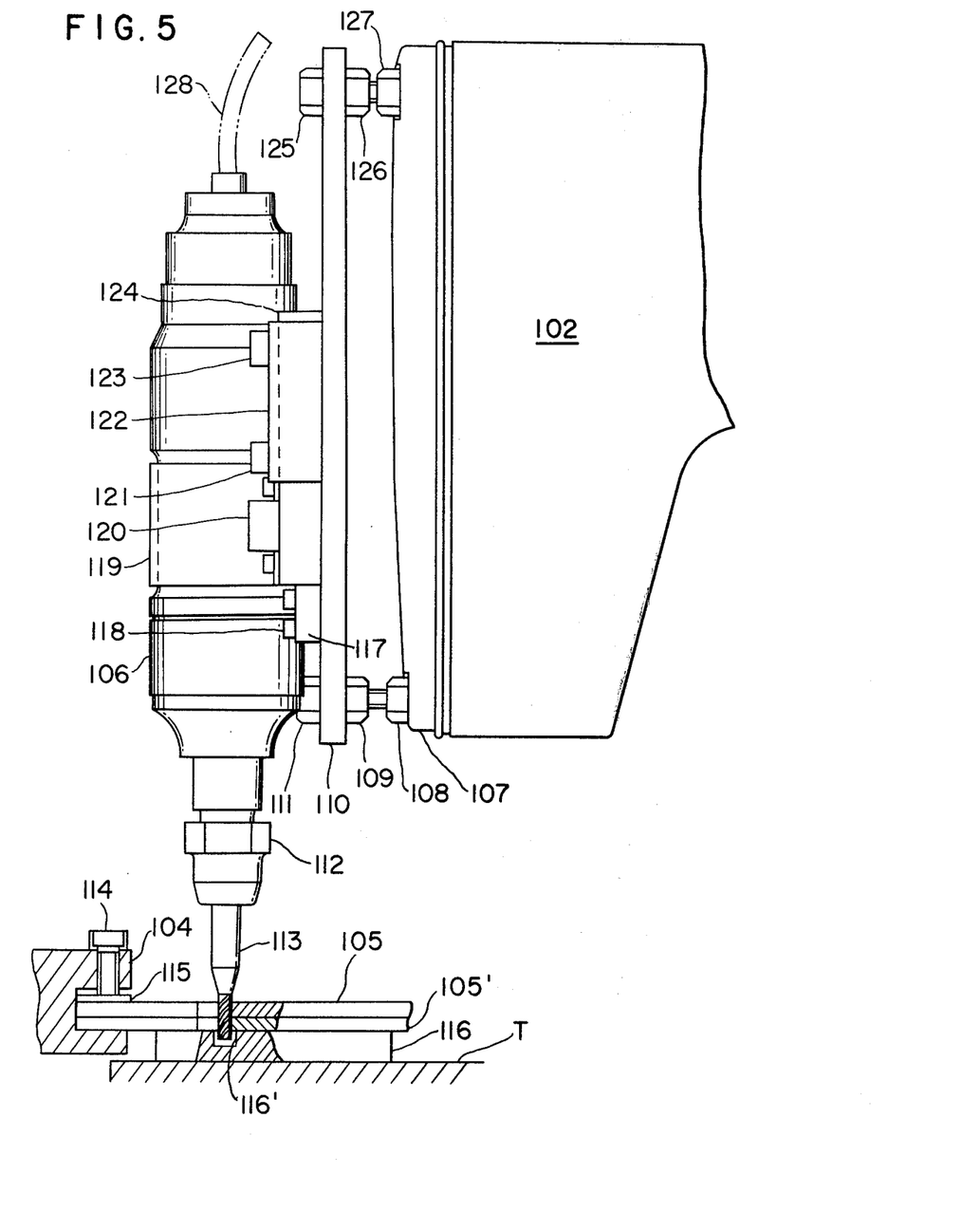
FIG. 5 is an enlarged side view, partly in section, of the embodiment shown in FIG. 4.
Figure 6:
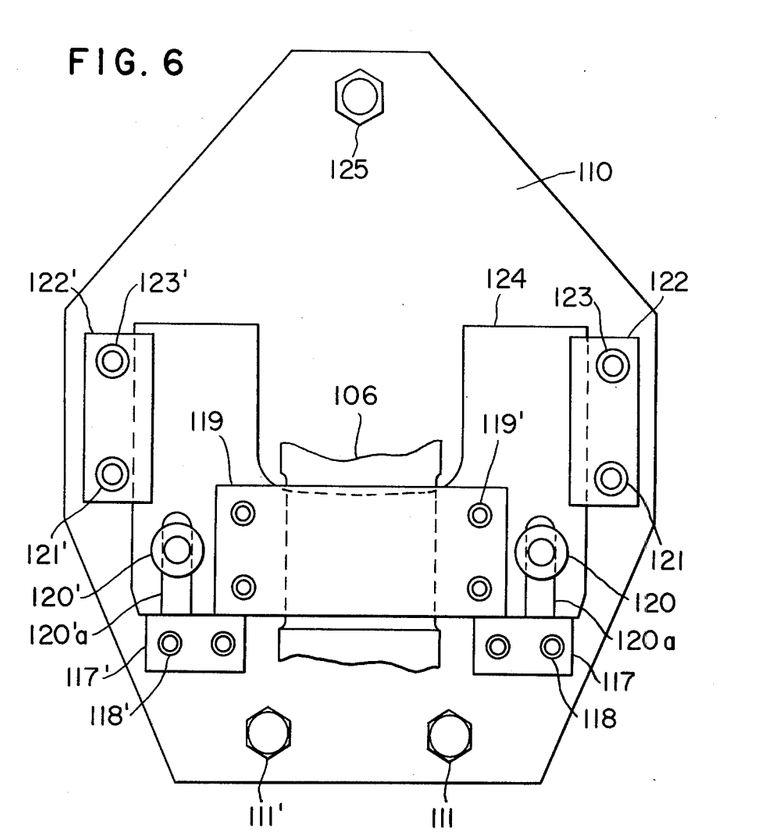
FIG. 6 is a lefthand side view of the embodiment shown in FIG. 5.
Figure 7:
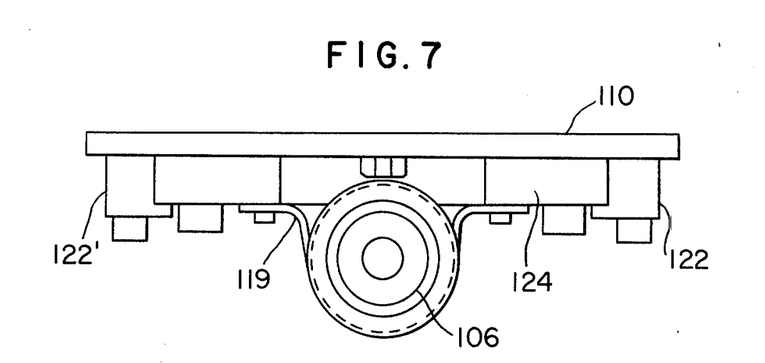
FIG. 7 is a top plan view of the embodiment shown in FIG. 6.

The detail of this embodiment is shown in FIGS. 5, 6 and 7. As shown, a supporting plate 110 is secured to the lefthand side cover 107 of head 102 by bolts 111, 125 and nuts 108, 109, 126 and 127. A working tool, a pneumatic drill 106, for example, is secured to the lefthand side of the supporting plate 110. The pneumatic drill is provided with an end mill 113 connected to its lower end by a chuck 112 and operated by compressed air supplied through an air hose 128.

A supporting platform 116 is secured to the table T and two blanks of the clamping members 105 and 105' made of plastic, for example, are slidably mounted on the supporting platform 116 by a plate 115 and a bolt 114 extending through a supporting flange 104. The end mill 113 cuts through two blanks of the clamping members 105 and 105' so that when they are moved relatively slots are formed through the blanks, thus obtaining the clamping member B shown in FIG. 3B.

As shown in FIG. 6, vertical guide members 122 and 122' are secured to the supporting plate 110 by bolts 121, 123, 121' and 123' and stop members 117 and 117' are also secured by bolts 118 and 118'. A mounting plate 124 is guided by the guide members 122 and 122' and the pneumatic tool 106 is clamped between the mounting plate 124 and a holding band 119 by bolts 119'. The mounting plate 124 is adjustably mounted on the supporting plate 110 by vertical slots 120a, 120a' and bolts 120 and 120' extending therethrough. Accordingly, it is possible to dismount the mounting plate 124 from the supporting plate 110 together with the pneumatic drill by loosening bolts 120 and 120'.

Turning back to FIG. 2 a transfer circuit 64 is connected to the output of the clock pulse generator 63 for supplying a feed pulse EP' having a lower frequency than the normal feed pulse EP to the pulse motors 56 and 61 when the blanks of the cloth clamping members are worked by the device shown in FIG. 5. Feed pulse EP' can be obtained by reducing the frequency of the feed pulse EP by a frequency divider or by using an independent clock pulse generator, not shown.

The working device shown in FIGS. 5 and 6 operates as follows. At first, the mounting plate 124 carrying the pneumatic drill 106 is inserted into the guide members 122 and 122' and temporarily held at an upper position by bolts 120 and 120'. The blanks 105 and 105' for manufacturing the upper and lower clamping members are set in the position shown in FIG. 5. Openings having the same diameter as the end mill 113 are formed beforehand through the blanks at the starting point of working. Alternatively, a mark may be applied to the starting point. In the following description it is assumed that such mark has been applied. The supporting platform 116 is secured to the table T of the sewing machine such that its opening 116' will be just beneath the end mill 113. After mounting the supporting flange 104 on the movable head 15 of the sewing machine, pressurized air is supplied to pneumatic drill 106 to rotate the end mill 113. The address selection switch 51 is set to address 0 and the frequency of the feed pulse EP' produced by the transfer circuit 64 is reduced to a frequency suitable for working the clamping members from the frequency of the normal feed pulse FP utilized for sewing operations. In the addresses 0 to 46 of the memory device 53 of the control device 22 are stored a program for performing a sewing operation by using a cloth clamping member shown in FIG. 3C (addresses 0 to 31) and working data for working the opening at the working origin and openings $R_1$ through $R_9$ for receiving pins (not shown) utilized to set the position of the cloth (addresses 32 to 46). Then the address selection switch 51 is set to address 0. The openings at $R_1$ through $R_8$ are simultaneously formed through two blanks, and pins are secured by a bonding agent to the openings of one blank. Then, these pins are received in the openings of the other blank for positioning the cloth.

Figure 3C:
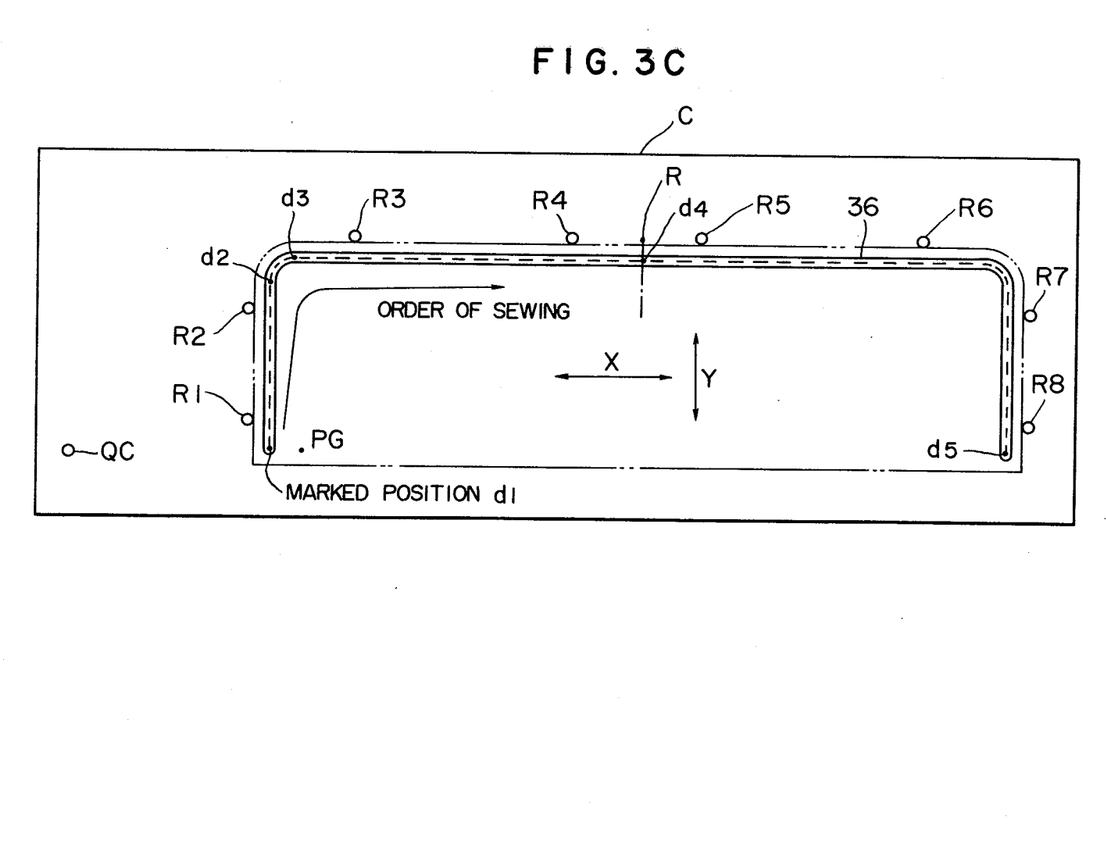

Upon application of a start signal S (FIG. 2) the address 0 of the memory device 53 is designated and since a stop code "1111" is assigned to this address as the type of the control the cloth clamping members will be moved to a program origin PG (see FIG. 3C). Address 1 stores a feed data between the program origin PG and the starting position of the sewing operation (marked position d1) whereby the needle is moved to a point near the marked position of the cloth clamping members. Since an optional stop code "1110" is assigned to address 2, the blanks 105 and 105' of the cloth clamping member are manually moved such that the end mill 113 will be positioned immediately above the blanks. The temporarily clamped pneumatic drill 106 is then lowered until it is stopped by stop members 117 and 117' and thereafter bolts 120 and 120' are tightened. As a consequence, the end mill 113 is brought to a condition shown in FIG. 5 in which it penetrates through the blanks 105 and 105'. When start signal S is applied again the data stored in address 3 and the following addresses are sequentially read out to move the end mill 113 relative to the blanks along the groove 36 to be cut.

Figure 9A:
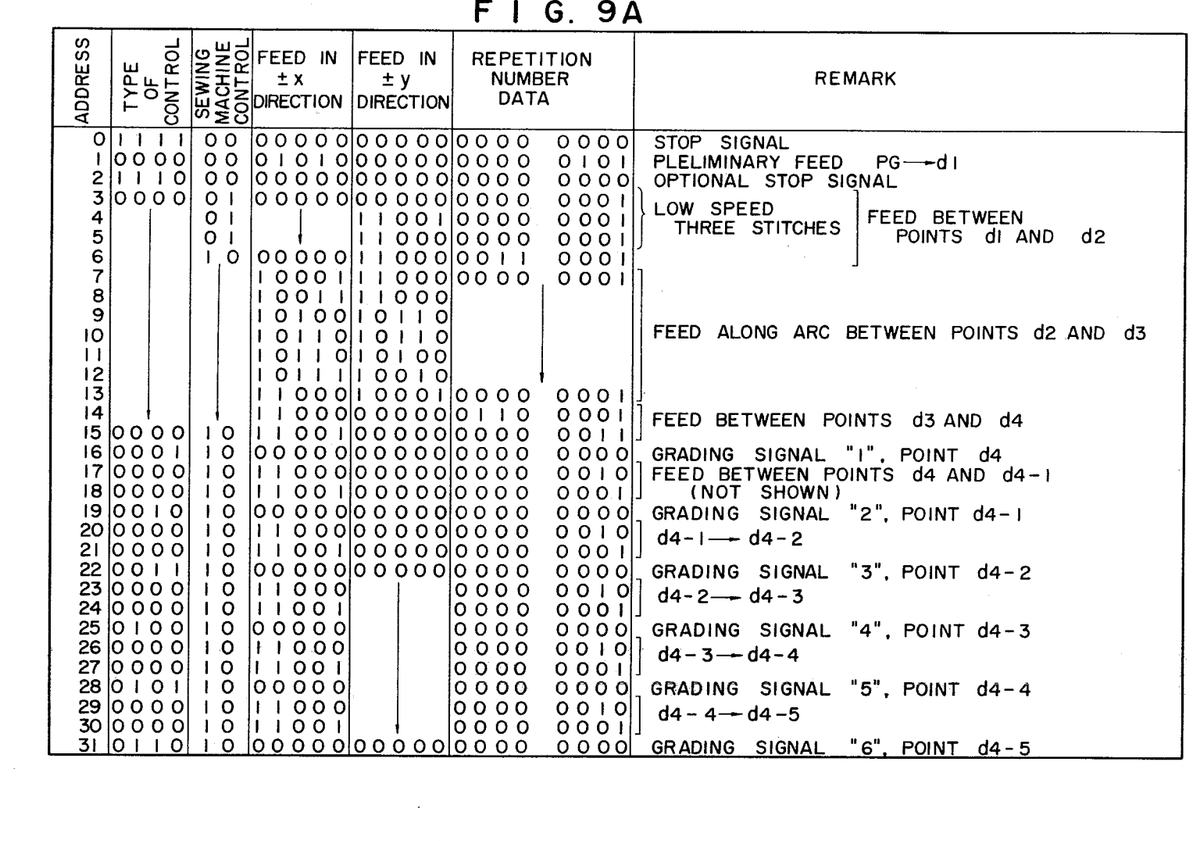
FIGS. 9A and 9B are tables showing various data corresponding to respective addresses in the memory device shown in FIG. 2.
Figure 9B:
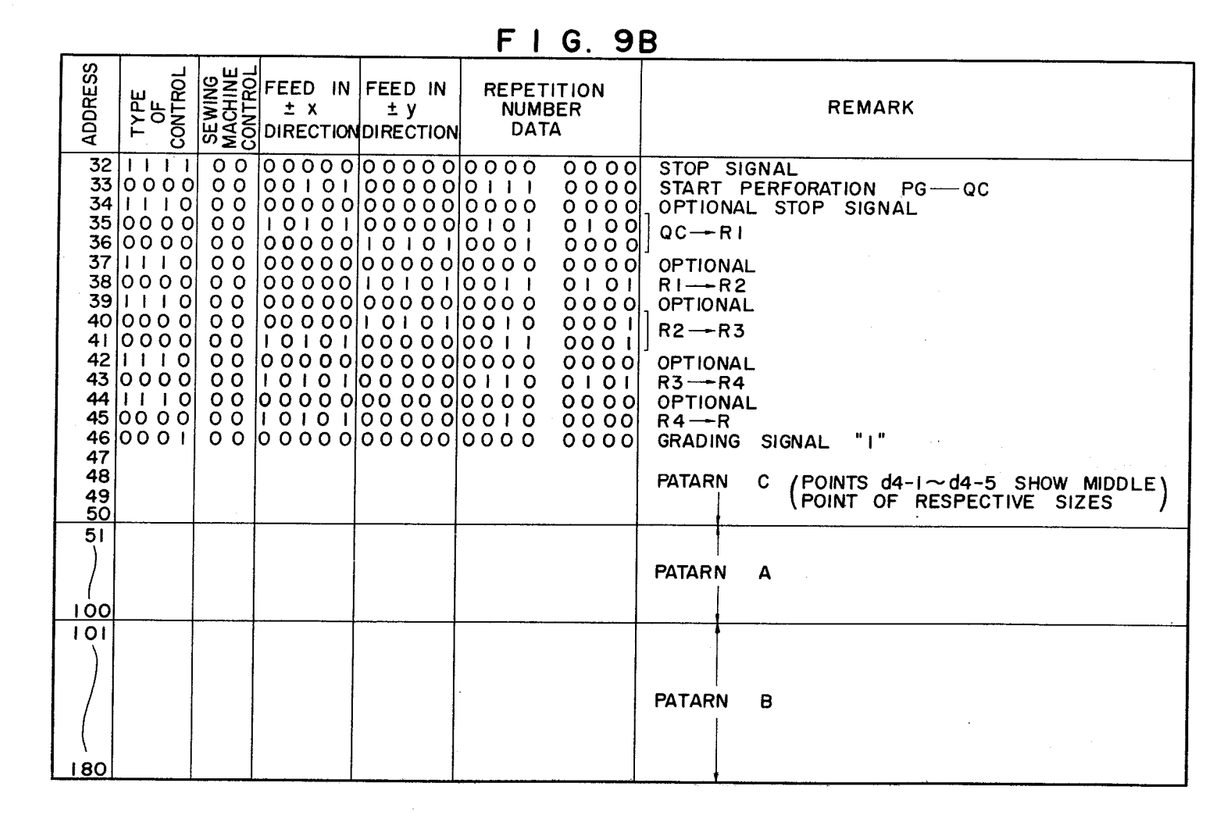

As shown in FIGS. 9A and 9B, X and Y data are stored in respective addresses of the memory device 35 in a manner such that the directions of feed in X and Y directions during each sewing pitch (which are represented by the bits at the leftmost sides of five bits), and the amounts of feed (which are represented by four bits except the leftmost bit) are given by pulses and that the data representing the number of repetitions of the pulses are set in X and Y registers 54 and 57 and the operation counter 58. Graded addresses such as 16, 19 and 22, for example, store data for working cuffs of different sizes. Since cuffs of different sizes have similar contour except their length, and since the contour is symmetrical with respect to the vertical center line it is possible to use similar codes except the length. Such method of coding is termed "grading." Each time a feed pulse EP' is produced, feed pulses ±XFP and ±YFP also including the information regarding the direction of feed are applied to the pulse motors 56 and 61. Whenever an interpolation is made for the contents of X and Y registers 54 and 57 for each sewing operation, the count of the operation counter 58 is reduced by one. When the count of this counter is reduced to zero the address counter 52 is advanced for reading the next address in the memory device 53, and the pulse distribution is made in the same manner as above described. By the pulse applied to pulse motors 56 and 61, the blanks 105 and 105' of the clamping members are fed continuously in the predetermined direction whereby the end mill 113 forms a groove having a desired profile. Instead of an end mill, it is also possible to use other suitable tools such as a rotary file, or a soldering iron or a heated wire where the blanks are made of thermoplastic resinous plates. When a cutting or grinding tool is used it is advantageous to use a suitable chip removing device. Further, the blank of the cloth clamping member to be machined may be an aluminum sheet or a rubber sheet containing a powder of permanent magnet. In any case, it is advantageous to simultaneously work two blanks while they are superposed as during the actual sewing operation.

When the grading is set to 6, the data stored in addresses 0 to 31 of the memory device 53 are sequentially read out, and as the address is returned to 0 from 31 the groove 36 shown in FIG. 3C is completed. However, during the return movement the sign of Y is reversed. At address 0 the type of the control is varied to stop code "1111" so that the groove cutting operation is stopped. At this time, the bolts 120 and 120' are loosened and the end mill 113 is raised. Thereafter bolts are tightened again, and the center of the end mill is returned to the program origin PG. Then, when the address selection switch 51 is set to address 33 and start signal S is applied the address counter 52 returns to zero and then jumps to a value 33 set by the address selection switch 51.

Upon designation of address 33, the data from the program origin PG to the working origin QC are read out to move the blanks of the cloth clamping members so as to align the axis of the end mill with the working origin QC. Under these conditions, the end mill 113 is lowered to form the opening corresponding to the working origin QC.

At address 34 the operation is optionally stopped and the end mill 113 is held at a raised position. Then, a start signal is applied to read out data stored in addresses 34 to address 38 corresponding to the position of the next pin opening $R_1$ and after stopping the end mill at a position immediately above the next pin opening $R_1$ the end mill 113 is lowered to work this opening. In the same manner, openings at positions $R_2$ to $R_8$ are sequentially worked.

By applying a grading at address 46 feed data to respective positions of openings $R_5$, $R_6$, $R_7$ and $R_8$ are obtained by reading out the data in the order of addresses 45, 43, 41–40 and 38. As above described, the memory device 53 stores programs of working openings $R_1$ through $R_8$ for positioning the blanks of the cloth clamping member in addition to the programs for working the opening at the working origin QC. The working positions corresponding to respective openings are designated in relation to the cutting of the groove (more particularly in the order of the program origin PQ→QC→$R_1$→$R_2$→. . . $R_8$) thereby assuring accurate opening positions.

For the actual sewing operation, the address selection switch 51 is not set to address 33 so that data in addresses 30 to 50 would not be read out, where no grading is made, as it is necessary to store the data corresponding to the released state of the designation of the address the number of addresses should be increased correspondingly.

FIG. 8 shows a modified embodiment of this invention in which instead of mounting the working tool on the head of a sewing machine as shown in FIG. 5, a working tool 203 is mounted on one end of a swing arm 202 rotatably mounted on a post 201 secured to the table T. During working of the blank 204 of a cloth clamping member, the arm 202 is clamped to the post 201 not to swing. After completion of the working of the blank 204, the arm 202 is rotated to a position not to interfere with the normal operation of the head 102.

FIGS. 9A and 9B are tables showing the contents of the memory device regarding the working data of a clamping member for the cuff shown in FIG. 3C in which addresses 0 to 31 store data regarding the groove 36 along which the needle is to be moved and addresses 33 to 40 store the data regarding the opening at the working origin and the openings $R_1$ through $R_8$ for positioning the cloth. Since the pattern is symmetrical with respect to the vertical center, a grading system is used.

Although in the embodiments described above, programs regarding sewing patterns were stored in the memory device, the invention is also applicable to other types of automatic sewing machines, for example a dart seamer, wherein a sewing pattern is recorded on a magnetic sheet or tape by using a profile control system, and the information stored in the magnetic sheet is picked up for driving the cloth clamping member by an analogue control system. In this case too, the speed of profiling should be reduced for working the cloth clamping member at a low speed by providing a transfer circuit similar to that shown in FIG. 2.

Although in the foregoing description, when forming a groove shaped pattern through a clamping member a perforation was performed at the starting point, where the clamping member is made of plastics, a mark may be formed at the starting point, in which case the end mill is positioned on the mark and pressed downwardly a little to form a perforation. Further, it should be understood that the cloth clamping member A shown in FIG. 3A can also be formed in the same manner by accurately finishing the periphery thereof by using a grinding wheel, for example.

The invention has the following advantages. It is possible to accurately finish the periphery of a cloth clamping member or form a groove having a predetermined profile through the cloth clamping member by using a memory device storing a predetermined sewing program and by merely mounting a working tool on an automatic sewing machine. Moreover, as the blank of the cloth clamping member to be worked is mounted on the movable head of the sewing machine which is program controlled during the normal use of the sewing machine it is not necessary to use any special machine tool for working the clamping plate. In other words, the same automatic sewing machine can be used for sewing clothes and for accurately working the blank of the cloth clamping member at a lower speed. It is only necessary to add a working tool which may be removably mounted on the head or mounted on a swing arm which is rotated to a position not interferring with the normal sewing operation, and a transfer circuit necessary to feed the blank to be worked at a lower speed than the normal sewing speed. Accordingly, the user of the sewing machine can prepare cloth clamping members of any profile by using his own sewing machine. The needle can be correctly positioned to the sewing operation starting position by inserting pin 31 mounted on one side of the head into an opening at the working origin on the blank of the cloth clamping member and the X-Y coordinate data for working the opening at the working origin is contained in the memory device in a correlated relationship with the data for working the groove of the blank. Consequently, the positioning of the starting point of the sewing operation can be made more accurately than the prior art control system wherein the groove is worked independently of the sewing operation.

As above described, the memory device stores not only the data for working the opening at the working origin but also the data for working pin openings for correctly mounting the cloth being sewed on the cloth clamping member so that it is possible to readily position the cloth between the clamping members by inserting pins in these openings.

We claim:

1. An automatic sewing machine comprising a movable head including a cloth clamping member for clamping a piece of cloth to be sewed to said movable head and provided with a profile corresponding to a predetermined sewing pattern, a memory device including a plurality of addresses for storing data concerning said sewing pattern and rectangular coordinate data for working an opening corresponding to a working origin on a blank of the cloth clamping member, electric drive means controlled by an electric signal read out from said memory device for moving said movable head at a predetermined speed thereby sewing said piece of cloth accoring to said sewing pattern, a work tool mounted on said sewing machine, means for mounting said blank of the cloth clamping member on said movable head at a position to be worked by said working tool, a pin adapted to be inserted into said opening for determining the sewing operation starting point, and means for driving said electric drive means at a speed lower than said predetermined speed, thereby working said blank to have said profile.

2. The automatic sewing machine according to claim 1, wherein said addresses further store data for working said blank in a correlated relationship with said rectangular coordinate data.

3. The automatic sewing machine according to claim 1 wherein said addresses further store data for working pin holes through said blank, said pin holes being adapted to receive pins for positioning a cloth on said cloth clamping member.

4. The automatic sewing machine according to claim 10 wherein said working tool forms a groove of said profile through said blank.

5. The automatic sewing machine according to claim 1 wherein said electric drive means comprises a pulse motor, and said sewing machine further comprises a source of pulse having a predetermined frequency, means responsive to said signal for supplying said pulse to said pulse motor, and means for supplying to said pulse motor a pulse having a frequency lower than said predetermined frequency when said blank is worked by said working tool.

* * * * *